United States Patent
Peterson et al.

(10) Patent No.: US 12,288,076 B2
(45) Date of Patent: Apr. 29, 2025

(54) REVERSIBLE VIRTUAL FACTORY RESET

(71) Applicant: Lenovo (United States) Inc., Morrisville, NC (US)

(72) Inventors: Nathan J. Peterson, Oxford, NC (US); John Petersen, Morrisville, NC (US); Gary Cudak, Raleigh, ND (US)

(73) Assignee: Lenovo (United States) Inc., Morrisville, NC (US)

(*) Notice: Subject to any disclaimer, the term of this patent is extended or adjusted under 35 U.S.C. 154(b) by 59 days.

(21) Appl. No.: 17/689,806

(22) Filed: Mar. 8, 2022

(65) Prior Publication Data
US 2023/0289192 A1 Sep. 14, 2023

(51) Int. Cl.
*G06F 9/4401* (2018.01)
*G06F 9/445* (2018.01)
*G06F 9/455* (2018.01)

(52) U.S. Cl.
CPC .......... *G06F 9/4406* (2013.01); *G06F 9/4416* (2013.01); *G06F 9/44505* (2013.01); *G06F 9/45558* (2013.01); *G06F 2009/45583* (2013.01)

(58) Field of Classification Search
CPC .. G06F 9/4406; G06F 9/4416; G06F 9/44505; G06F 9/45558; G06F 2009/45583; G06F 9/4401; G06F 11/1417; G06F 1/24

USPC .................................................. 713/1, 2, 100
See application file for complete search history.

(56) References Cited

U.S. PATENT DOCUMENTS

| | | | |
|---|---|---|---|
| 2005/0229039 A1* | 10/2005 | Anderson | G06F 11/1417 714/E11.134 |
| 2008/0168299 A1* | 7/2008 | Kateley | G06F 11/1417 714/2 |
| 2010/0005285 A1* | 1/2010 | Yun | G06F 1/1656 713/2 |
| 2016/0196145 A1* | 7/2016 | Liverance | G06F 1/24 713/2 |
| 2021/0149578 A1* | 5/2021 | Xu | H04L 41/0806 |
| 2021/0325948 A1* | 10/2021 | Lee | G06F 3/0632 |
| 2022/0187799 A1* | 6/2022 | Li | H04L 41/0803 |

* cited by examiner

*Primary Examiner* — Ji H Bae
(74) *Attorney, Agent, or Firm* — Schwegman Lundberg & Woessner, P.A.

(57) ABSTRACT

A computer implemented method includes receiving a request for a boot into a system factory reset mode, accessing a virtual boot indication in an operating system memory area, identifying an address of a virtual boot user space memory area as a function of the virtual boot indication, and booting the system into the factory reset mode using the virtual boot user space memory without overriding user settings in the user space memory.

19 Claims, 2 Drawing Sheets

REVERSIBLE VIRTUAL FACTORY RESET

BACKGROUND

To debug certain device issues, users are often told to go ahead, and factory reset their device. There are very few other alternatives when something such as that might be necessary, but the issue is that it's often not necessary. Windows PCs have things like Safe Mode and Clean Boot. Neither of these are truly a factory reset environment.

SUMMARY

A computer implemented method includes receiving a request for a boot into a system factory reset mode, accessing a virtual boot indication in an operating system memory area, identifying an address of a virtual boot user space memory area as a function of the virtual boot indication, and booting the system into the factory reset mode using the virtual boot user space memory without overriding user settings in the user space memory.

DETAILED DESCRIPTION

Figure 1:
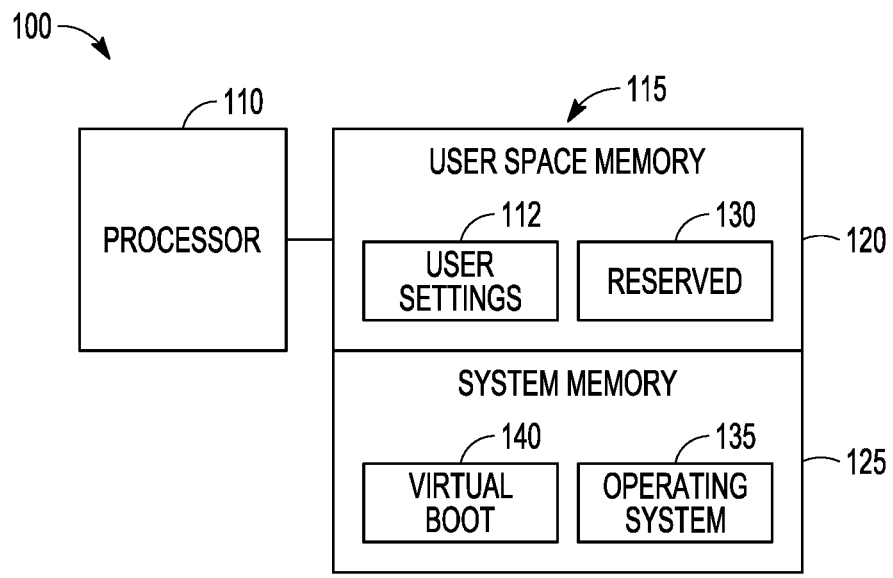
FIG. 1 is a block diagram of a system capable of performing a virtual boot by a processor into a factory reset mode without erasing user settings in a memory according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

To debug certain device issues, users are often told to go ahead, and factory reset their device, resulting in loss of customizations, such as language choice and application settings.

FIG. 1 is a block diagram of a system 100 capable of performing a virtual boot by a processor 110 into a factory reset mode without erasing user settings 112 in a memory 115. The user settings are in a user memory space 120 that is writable by a user and typically contains information identifying user preferences, such as language, font sizes, programs to run, and other settings for a normal boot.

The virtual factory boot provides a way to boot into a clean factory reset mode one or multiple times, while maintaining the ability to revert to a desired normal boot environment. On some devices, such as Android® devices, an operating system memory area 125 and the user data memory area 120 are distinct memory areas. The operating system memory area 125 is a read-only partitioned area that is protected from writing by a user. The user data memory area 120 is the area where user-initiated changes, such as settings 112, are written. Currently when a user selects a factory reset, the user data area 120 is wiped, along with user customizations in settings 112.

The virtual factory boot may be selected either from a settings menu or a firmware boot menu. The virtual factory boot is pointed to an empty memory space shown as reserved space 130 that is different than the user data area that was previously written with user data such as settings 112. Rather than deleting the actual user data, the system 100 can be booted and an operating system 135 is pointed to a clean user data area for that boot. The virtual factory boot mimics a factory reset while maintaining an option to revert to a normal boot using user settings 112 upon reboot.

In one example, a virtual boot bit or bits 140 in the operating system protected memory area are set in response to a user selecting to perform a virtual factory boot, or prior to a request for a reset. Upon initiation of a boot, the operating system checks the bit or bits. If the bit or bits are set to indicate a virtual factor boot is performed, the operating system is directed to a reserved area of the user space. In a further example, a request for a reset may initiate the operating system to provide a menu offering Instead of deleting existing settings in the user space, the reserved area, which does not contain user data, is used during the virtual boot process.

The virtual boot allows the operating system to boot into what appears to be a factor reset memory space, without applying any modifications to the boot process that were previously configured by the user. For example, a user may have added a new messaging application in place of an operating system application. The virtual boot results in the original operating system messaging application being started as opposed to the new messaging application. If the virtual boot is successful, then it may be surmised that one of the settings or application in the user space was the source of an error.

Following the virtual boot, the virtual boot bit or bits may be reset if desired. A regular boot will result in the operating system being pointed to the user space, which was not erased in response to the virtual factory reboot. The regular boot will now result in a boot with user modifications being applied.

Figure 2:
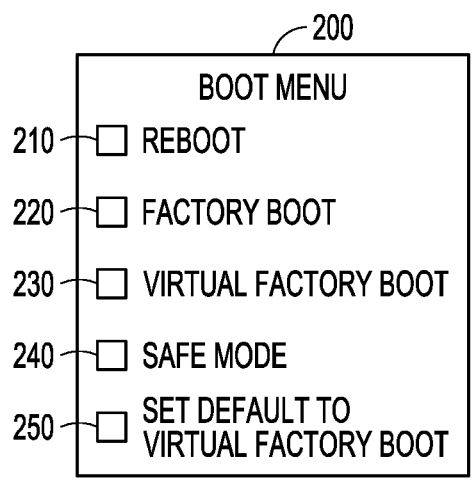
FIG. 2 is a representation of a boot menu for selecting different options for booting a system according to an example embodiment.

FIG. 2 is a representation of a boot menu 200 for selecting different options for booting the system 100. In one example, the options may be selected via a check box or other user interface constructed in menu 200, and includes a reboot 210, a factory reboot 220, a virtual factory boot 230, and a safe mode 240. The virtual factory boot option 230 allows a user or support center to test specific issues without the user's additional apps and software running that could be causing any instabilities, etc. In the result that the issue is still found with the clean data area, the support center would be able to determine that it is an issue with the operating system or hardware.

The user may reboot to their normal data area by selecting reboot option 210 from the boot menu 200. The virtual boot indication may be modified to indicate a normal boot using the user settings 112. The operating system 135 is then pointed back to the user settings 112 during the boot resulting in the user settings being used during the boot.

In a further example, the boot menu 200 provides a checkbox selection 250 to set the default to a virtual factory boot. This selection sets the virtual boot bits 140 to point to the reserved area 130 such that selecting a boot or reboot results in a virtual factory boot being performed. Unchecking selection 250 results in the ability to boot normally using the user settings.

Figure 3:
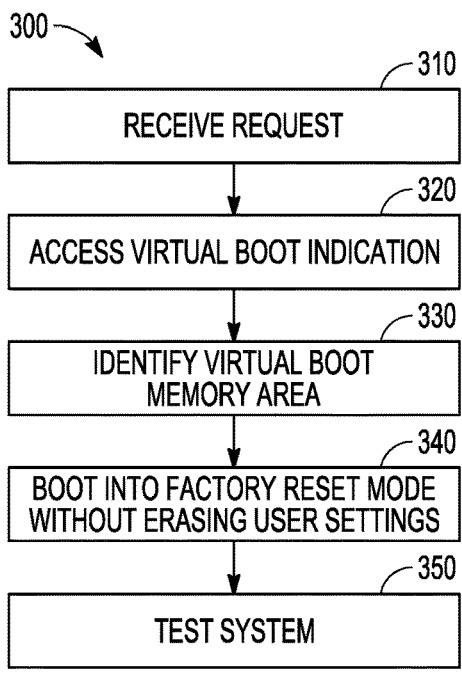
FIG. 3 is a flowchart illustrating a computer implemented method for performing a virtual factory reset boot according to an example embodiment.

FIG. 3 is a flowchart illustrating a computer implemented method 300 for performing a virtual factory reset boot. Method 300 begins at operation 310 by receiving a request for a boot into a system factory reset mode. The request for a boot into a system factory reset mode may be received from one of a settings menu, a boot menu, or a command.

A virtual boot indication in an operating system memory area is accessed at operation 320. The virtual boot indication may be located in the operating system memory area and is settable via a settings menu having administrative access rights. The virtual boot indication may be set in response to receiving the request. At operation 330, an address of a virtual boot user space memory area is identified as a function of the virtual boot indication. The virtual boot user space memory area is a clean reserved user data area that contains no user settings.

In one example, the address of virtual boot user space memory area identifies a range of addresses. In a further example, the address of a virtual boot user space memory area identifies a subdirectory or partition of a memory storage device.

The system is booted at operation 340 into the factory reset mode using the virtual boot user space memory without overriding user settings in the user space memory. Booting the system into the factory reset mode may include erasing the virtual boot user space memory area. Booting the system into the factory reset mode includes booting the operating system from the operating system memory area which is read-only partitioned and does not result in erasing user space outside the virtual boot user space memory area.

At operation 350, the system may be tested following booting the system into the factory reset mode. Testing of the system may be performed without any changes to the system by the user being performed during the booting into the factory reset mode. This allows one to identify whether faults or errors are being caused by the factory version of the system and operating system. If no such faults or errors are found, it may be assumed any faults or errors are being caused by user settings, such as a program that is initiated during a boot utilizing the user settings.

Figure 4:
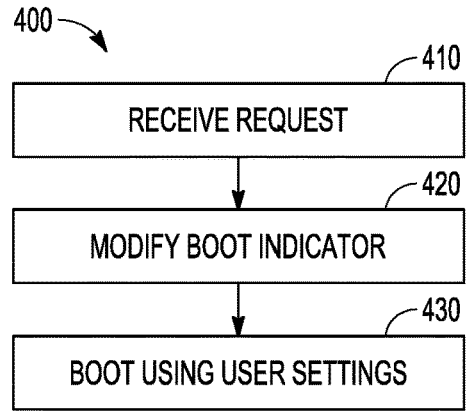
FIG. 4 is a flowchart illustrating a computer implemented method of booting the system normally following a booting into the factory reset mode using the virtual boot user space memory according to an example embodiment.

FIG. 4 is a flowchart illustrating a computer implemented method 400 of booting the system normally following a booting into the factory reset mode using the virtual boot user space memory. Since user modifications to the boot process are not implemented during booting the system into the factory reset mode using the virtual boot user memory space, the system may be booted if desired back into a normal mode. Booting back into the normal mode may be done at operation 410 in response to receiving an indication to reboot the system. The request may be received using menu 200, or by other means, such as a command.

The virtual boot indication may be modified at operation 420 to indicate a normal boot. At operation 430, the system is booted using a user space address of the user memory space containing user settings. By rebooting the system utilizing the user settings in the user space memory. The user space address may identify a range of addresses, a subdirectory, or a default area of user space memory designated for user settings.

Figure 5:
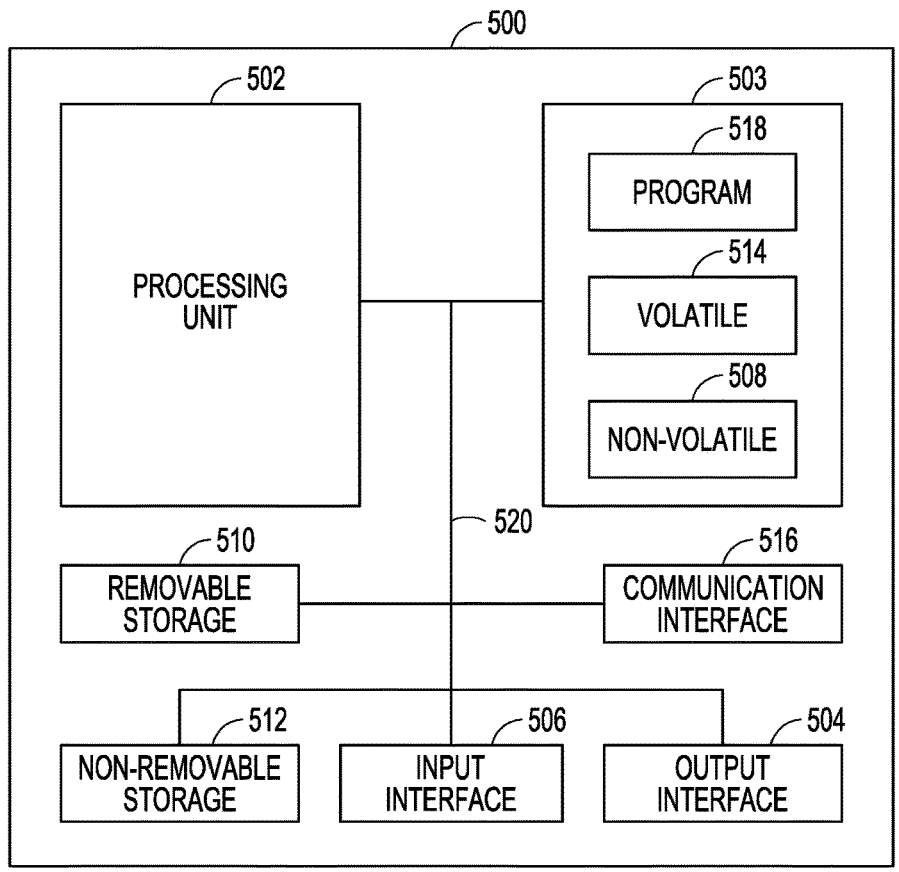
FIG. 5 is a block schematic diagram of a computer system to implement one or more example embodiments.

FIG. 5 is a block schematic diagram of a computer system 500 to perform system boots for a system factory reset mode while selecting a virtual boot user space memory to preserve user settings in user space memory and for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

EXAMPLES

1. A computer implemented method includes receiving a request for a boot into a system factory reset mode, accessing a virtual boot indication in an operating system memory area, identifying an address of a virtual boot user space memory area as a function of the virtual boot indication, and booting the system into the factory reset mode using the virtual boot user space memory without overriding user settings in the user space memory.

2. The method of example 1 wherein booting the system into the factory reset mode comprises booting the operating system from the operating system memory area which is read-only partitioned.

3. The method of any of examples 1-2 wherein the virtual boot indication is located in the operating system memory area and is settable via a settings menu having administrative access rights.

4. The method of any of examples 1-3 wherein the virtual boot user space memory area is a clean reserved user data area that contains no user settings.

5. The method of example 4 wherein the address of virtual boot user space memory area identifies a range of addresses.

6. The method of any of examples 1-5 wherein booting the system into the factory reset mode includes erasing the virtual boot user space memory area.

7. The method of example 6 wherein booting the system into the factory reset mode does not erase user space outside the virtual boot user space memory area.

8. The method of any of examples 1-7 and further including testing the system following booting the system into the factory reset mode.

9. The method of any of examples 1-8 and further including rebooting the system utilizing the user settings in the user space memory.

10. The method of example 9 and further including receiving an indication to reboot the system, modifying the virtual boot indication to indicate a normal boot, and booting the system using a user space address of the user memory space containing user settings.

11. The method of example 10 wherein the user space address identifies a range of addresses.

12. The method of any of examples 1-11 wherein the address of a virtual boot user space memory area identifies a subdirectory or partition of a memory storage device.

13. The method of any of examples 1-12 wherein the request for a boot into a system factory reset mode is received from one of a settings menu, a boot menu, or a command.

14. A machine-readable storage device has instructions for execution by a processor of a machine to cause the processor to perform operations to perform a method. The operations include receiving a request for a boot into a system factory reset mode, accessing a virtual boot indication in an operating system memory area, identifying an address of a virtual boot user space memory area as a function of the virtual boot indication, and booting the system into the factory reset mode using the virtual boot user space memory without overriding user settings in the user space memory.

15. The device of example 14 wherein booting the system into the factory reset mode includes booting the operating system from the operating system memory area which is read-only partitioned, wherein the virtual boot indication is located in the operating system memory area and is settable via a settings menu having administrative access rights, and wherein the virtual boot user space memory area is a clean reserved user data area that contains no user settings.

16. The device of any of examples 14-15 wherein the operations further include receiving an indication to reboot the system, modifying the virtual boot indication to indicate a normal boot, and booting the system using a user space address of the user memory space containing user settings.

17. The device of any of examples 14-16 wherein the user space address identifies a range of addresses, wherein the address of a virtual boot user space memory area identifies a subdirectory or partition of a memory storage device, and wherein the request for a boot into a system factory reset mode is received from one of a settings menu, a boot menu, or a command.

18. A device includes a processor and a memory device coupled to the processor and having a program stored thereon for execution by the processor to perform operations. The operations include receiving a request for a boot into a system factory reset mode, accessing a virtual boot indication in an operating system memory area, identifying an address of a virtual boot user space memory area as a function of the virtual boot indication, and booting the system into the factory reset mode using the virtual boot user space memory without overriding user settings in the user space memory.

19. The device of example 18 wherein booting the system into the factory reset mode includes booting the operating system from the operating system memory area which is read-only partitioned, wherein the virtual boot indication is located in the operating system memory area and is settable via a settings menu having administrative access rights, and wherein the virtual boot user space memory area is a clean reserved user data area that contains no user settings.

20. The device of any of examples 18-19 wherein the operations further include receiving an indication to reboot the system, modifying the virtual boot indication to indicate a normal boot, and booting the system using a user space address of the user memory space containing user settings, wherein the user space address identifies a range of addresses, wherein the address of a virtual boot user space memory area identifies a subdirectory or partition of a memory storage device, and wherein the request for a boot into a system factory reset mode is received from one of a settings menu, a boot menu, or a command.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving a request for a boot into a factory reset mode;
accessing a virtual boot indication in an operating system memory area;
identifying an address of a virtual boot user space memory area in user space memory as a function of the virtual boot indication; and
booting the system into the factory reset mode using the virtual boot user space memory wherein booting includes erasing the virtual boot user space memory area without erasing user settings that were written to the user space memory prior to booting the system into the factory reset mode.

2. The method of claim 1 wherein booting the system into the factory reset mode comprises booting the operating system from the operating system memory area which is read-only partitioned.

3. The method of claim 1 wherein the virtual boot indication is located in the operating system memory area and is settable via a settings menu having administrative access rights.

4. The method of claim 1 wherein the virtual boot user space memory area is a clean reserved user data area that contains no user settings.

5. The method of claim 4 wherein the address of virtual boot user space memory area identifies a range of addresses.

6. The method of claim 1 wherein booting the system into the factory reset mode does not erase user space outside the virtual boot user space memory area.

7. The method of claim 1 and further comprising testing the system following booting the system into the factory reset mode.

8. The method of claim 1 and further comprising rebooting the system utilizing the user settings in the user space memory.

9. The method of claim 8 and further comprising:
receiving an indication to reboot the system;
modifying the virtual boot indication to indicate a normal boot; and
booting the system using a user space address of the user memory space containing the user settings.

10. The method of claim 9 wherein the user space address identifies a range of addresses.

11. The method of claim 1 wherein the address of a virtual boot user space memory area identifies a subdirectory or partition of a memory storage device.

12. The method of claim 1 wherein the request for a boot into the factory reset mode is received from one of a settings menu, a boot menu, or a command.

13. A non-transitory machine-readable storage device having instructions for execution by a processor of a machine to cause the processor to perform operations to perform a method, the operations comprising:
receiving a request for a boot into a factory reset mode;
accessing a virtual boot indication in an operating system memory area;
identifying an address of a virtual boot user space memory area in user space memory as a function of the virtual boot indication; and
booting the system into the factory reset mode using the address of the virtual boot user space memory wherein booting includes erasing the virtual boot user space memory area without erasing user settings that were written to the user space memory prior to booting the system into the factory reset mode.

14. The device of claim 13 wherein booting the system into the factory reset mode comprises booting the operating system from the operating system memory area which is read-only partitioned, wherein the virtual boot indication is located in the operating system memory area and is settable via a settings menu having administrative access rights, and wherein the virtual boot user space memory area is a clean reserved user data area that contains no user settings.

15. The device of claim 13 wherein the operations further comprise:
receiving an indication to reboot the system;

modifying the virtual boot indication to indicate a normal boot; and booting the system using a user space address of the user memory space containing the user settings.

16. The device of claim 13 wherein the address of a virtual boot user space memory area identifies a range of addresses, wherein the address of a virtual boot user space memory area identifies a subdirectory or partition of a memory storage device, and wherein the request for a boot into the factory reset mode is received from one of a settings menu, a boot menu, or a command.

17. A device comprising:
a processor; and
a memory device coupled to the processor and having a program stored thereon for execution by the processor to perform operations comprising:
  receiving a request for a boot into a factory reset mode;
  accessing a virtual boot indication in an operating system memory area;
  identifying an address of a virtual boot user space memory area in user space memory as a function of the virtual boot indication; and
  booting the system into the factory reset mode using the address of the virtual boot user space memory wherein booting includes erasing the virtual boot user space memory area without erasing user settings that were written to the user space memory prior to booting the system into the factory reset mode.

18. The device of claim 17 wherein booting the system into the factory reset mode comprises booting the operating system from the operating system memory area which is read-only partitioned, wherein the virtual boot indication is located in the operating system memory area and is settable via a settings menu having administrative access rights, and wherein the virtual boot user space memory area is a clean reserved user data area that contains no user settings.

19. The device of claim 17 wherein the operations further comprise:
receiving an indication to reboot the system;
modifying the virtual boot indication to indicate a normal boot; and
booting the system using a user space address of the user memory space containing the user settings, wherein the user space address identifies a range of addresses, wherein the address of a virtual boot user space memory area identifies a subdirectory or partition of a memory storage device, and wherein the request for a boot into the factory reset mode is received from one of a settings menu, a boot menu, or a command.

* * * * *